United States Patent
Vaucher

(10) Patent No.: US 6,809,455 B2
(45) Date of Patent: Oct. 26, 2004

(54) BRUSH HOLDER COMPRISING BRUSHES WITH CONTACT TABS, SPRING AND DAMPING ELEMENT

(75) Inventor: Bernard Vaucher, La Chaux-de-Fonds (CH)

(73) Assignee: API Portscap, La Chaux-de-Fonds (CH)

( * ) Notice: Subject to any disclaimer, the term of this patent is extended or adjusted under 35 U.S.C. 154(b) by 7 days.

(21) Appl. No.: 10/221,308

(22) PCT Filed: Mar. 14, 2001

(86) PCT No.: PCT/IB01/00363

§ 371 (c)(1),
(2), (4) Date: Sep. 10, 2002

(87) PCT Pub. No.: WO01/69760

PCT Pub. Date: Sep. 20, 2001

(65) Prior Publication Data

US 2003/0048025 A1 Mar. 13, 2003

(30) Foreign Application Priority Data

Mar. 14, 2000 (CH) .............................................. 0485/00

(51) Int. Cl.[7] .............................................. H01R 39/18
(52) U.S. Cl. ..................... 310/248; 310/239; 310/244; 310/251
(58) Field of Search .................................. 310/248, 251, 310/247, 246, 244, 242, 239, 228, 219, 220, 221, 51

(56) References Cited

U.S. PATENT DOCUMENTS

| | | | | |
|---|---|---|---|---|
| 3,590,300 A | * | 6/1971 | Moberly ..................... 310/248 |
| 4,119,875 A | * | 10/1978 | Noguchi et al. ............ 310/248 |
| 5,141,702 A | * | 8/1992 | Guenin et al. ................. 419/8 |
| 5,696,418 A | * | 12/1997 | Corbach et al. ............ 310/239 |
| 5,780,952 A | * | 7/1998 | Lau ............................. 310/239 |

\* cited by examiner

Primary Examiner—Tran Nguyen
Assistant Examiner—Leda Pham
(74) Attorney, Agent, or Firm—Woodard, Emhardt, Moriarty, McNett & Henry LLP; Clifford W. Browning

(57) ABSTRACT

The invention concerns a commutator device (1) for electric motor, comprising a housing part (2) and commutator brushes (3) housed in the housing part, each brush comprising a contact surface (8) designed to be pressed in contact against a commutator of the rotor of the electric motor, and a spring part (9) connected to the contact part (7) so as to exert a force on said contact part towards the rotor commutator. The device further comprises a damping element (14) arranged to absorb the vibrations or movements of the contact part of the brushes. The damping element (14) is a thixotropic lubricant.

9 Claims, 1 Drawing Sheet

BRUSH HOLDER COMPRISING BRUSHES WITH CONTACT TABS, SPRING AND DAMPING ELEMENT

Figure 2:
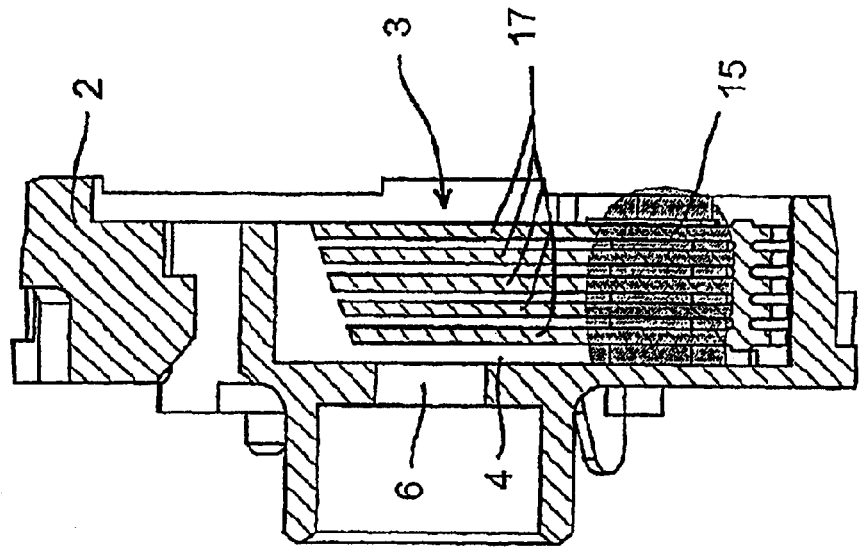

The present invention concerns a commutator device for electric motors, and particularly motors with a rotor comprising one or several coils supplied with electric current by a commutator device.

In a motor of this type, the conducting wires of the coils are connected to corresponding commutator blades mounted around an axle portion of the motor against which the commutator brushes which are connected to leads of a power circuit are pressed. The contact between a contact surface of the brush and the commutator blades is secured by a spring, for instance an elastic arm embedded at one end portion and holding the contact surface close to the other end portion. It is known to lubricate the contact surfaces between the brushes and the commutator on the motor axle in order to reduce wear and lengthen the motor's life. Conventional motors still undergo wear by electroerosion caused by sparks arising between the brushes and the commutator blades, particularly because of the separation of the contacting surfaces resulting from brush vibrations.

In view of these drawbacks, it is an object of the invention to reduce the wear of the commutator parts of electric motors and enhance the efficiency and reliability of these motors. It is an advantage, furthermore, to provide a commutator device for motors that is compact and economic.

Objects of the invention have been achieved by a commutator device for a motor according to claim 1.

In the present invention a commutator device for an electric motor comprises a housing part and commutator brushes housed in said housing part while each brush comprises a contact surface designed to be pressed against a commutator part of a rotor of an electric motor, and a spring part attached to the contact part so as to exert a force on that contact part in the direction of the rotor's commutator part, the device further comprising a damping element arranged so as to absorb the vibrations or movements of the contact part of the brushes. The damping of the brushes also allows the life of the motor to be extended, by reducing the sparks arising from instances of separation of the contact surfaces of the brushes from the rotor's commutator part. The damping element can advantageously comprise a supply of lubricant also serving to lubricate the contact surfaces of the brushes.

The spring part of the brushes can advantageously be an elastic arm extending between a mounting part of the brush that is mounted on the housing part and a contact part that is arranged close to one free end of the brush. The damping element can be arranged along the elastic arm, by enveloping part of the arm. The lubricant supply can be arranged in a reservoir part of the housing part, for instance in the form of a cavity that is arranged around a portion of the spring part of the brushes. The lubricant can be a thixotropic lubricant so that it retains its shape and position in the reservoir while allowing a small amount of the lubricant to migrate along the brushes, for instance by capillarity (surface tension), until it reaches the contact surfaces.

Using a lubricant, both as a damping element and as a lubricant is advantageous in that it allows the design of the commutator device for motors to be simplified and a low-cost device to be realised that still is highly efficient and compact.

Figure 1:
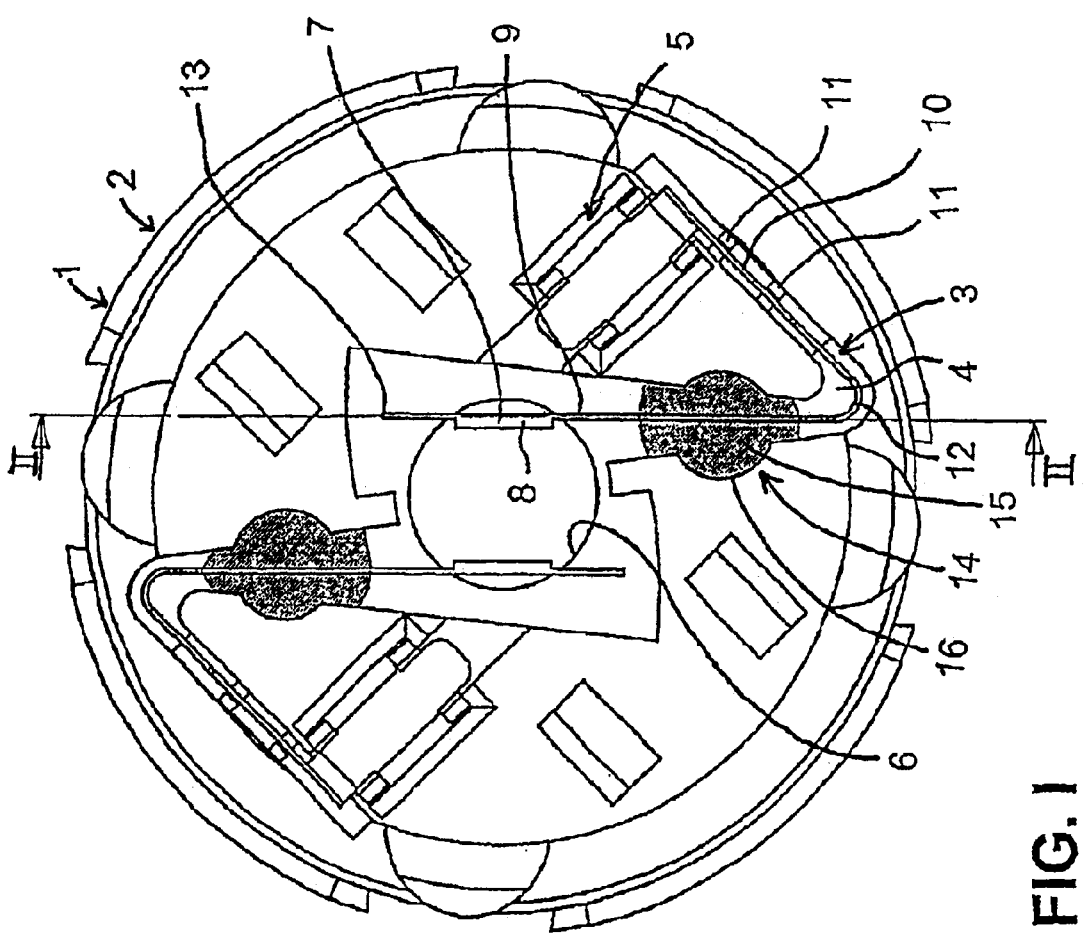

Other aspects, advantages and objectives of the invention will be apparent from the detailed description that follows, and from the attached drawings in which FIG. 1 is a view of a commutator device for motors according to the invention; and FIG. 2 is a section along line II—II of FIG. 1.

In the example illustrated, a commutator device 1 for electric motors comprises a housing part 2, brushes 3 housed in recesses 4 of the housing part, and electrical connection parts 5 for electrical connection of the brushes to electrical supply leads. The housing part can be a housing part of an electric motor, for instance a motor cover having a passage 6 for an axle of a rotor with coils of the motor. The rotor axle can be surrounded by commutator blades connected with the leads of the coils. Each brush 3 comprises a contact part 7 with a contact surface 8 resting against the rotor's commutator part, a spring part 9, and a mounting part 10.

The mounting part 10 of the brush is mounted in the cover by being inserted into slits of clamps 11 which for instance are injection molded and constitute an integrated part of the housing part. The mounting part 10 of the brushes is in electrical contact, for instance by soldering or by being integrally formed with the connecting part 5 that may be in the form of a known insulation displacement terminal or other known connection terminals, to electrical supply leads or outside connectors. In the example illustrated, the mounting part 10 is connected with the spring part 9 by an elbow part 12 in such a way that the brush is generally V-shaped. The spring part 9 has the shape of an elastic arm extending from the elbow part 12 to the contact part 10 that is close to a free end 13 of the brush. In its neutral position shown in FIG. 1, the contact part 7 of the brush 3 cuts across the passage 6 for the rotor axle in such a way that, when the commutator device 1 is mounted on an electric motor, the elastic arm 9 of each brush is bent in the direction of the corresponding connecting part 5.

In conventional motors during operation, the rotation of the rotor and of the devices connected to the motor may give rise to brush vibrations such that their contact surfaces 8 separate from the corresponding contact surfaces of the rotor commutator blades so as to cause spark formation. These sparks cause wear of the contact surfaces by electroerosion shortening the motor's life.

For a reduction or elimination of wear of the commutator's contact surfaces, the commutator device 1 is equipped with a damping element 14 acting on the brush and more particularly on the spring part 9 of the brush. The damping element 14 comprises a supply of lubricant 15 located in a reservoir part 16 realised in the housing part 2, for instance as a cavity arranged between the elbow part 12 and the contact part 7 of the brush. Over part of its length, the spring part 9 is surrounded by the lubricant supply 15 in such a way that its movements are damped by the lubricant by virtue of the viscous properties of the lubricant. Preferably, the lubricant 15 is a thixotropic lubricant, so that it will preserve its shape while allowing a thin layer of lubricant to migrate along the brush until it reaches the contact surface 8, for instance by capillarity (or a reduction of surface energy), in order to lubricate this surface. Using a thixotropic lubricant for the purposes of damping and lubricating the brushes is highly advantageous because of the simplicity and compactness of design, simultaneously it enhances the reliability of lubrication of the contact surfaces and reduces wear.

The lubricant can also be present as a gel, or contained in a soft and porous material such as felt or sponge.

The contact part 7 of the brushes can be arranged on a multitude of elastic blades 17 mounted side by side, as shown in FIG. 2, so as to optimise the contact between the brushes and the commutator blades. Each of these elastic blades is surrounded over part of its length by lubricant 15.

Relative to a single blade, the probability of loss of contact is diminished by having a multitude of blades side by side. In addition, the blades differ in their lengths so as to stagger the resonance frequencies of the different blades.

The use of a multitude of blades arranged side by side and constituting the elastic arm as well as the contact parts thus improves the contact with the rotor commutator.

A commutator device for motors according to the invention advantageously reduces the wear of the contact surfaces of the commutator while making the design simple, compact, and economic.

What is claimed is:

1. A commutator device (1) for an electric motor comprising a housing part (2) and commutator brushes (3) housed in said housing part, each brush comprising a contact part (7) having a contact surface (8) adapted to be pressed against a commutator part of a rotor of the electric motor, a spring part (9) attached to the contact part (7) so as to exert a force on said contact part in the direction of the rotor's commutator part, and a damping element (14), comprising a supply of lubricant (15), being disposed in the housing part and around said spring part and being arranged so as to absorb the vibrations or movements of the contact part (7) of the brush.

2. Device according to claim 1, wherein the lubricant is thixotropic.

3. Device according to claim 1, wherein the lubricant is contained in a soft and porous material.

4. Device according to claim 1, wherein the lubricant supply (15) is arranged in a reservoir part (16) formed in the housing part around a portion of the spring part (9) of the brush.

5. Device according to claim 1, wherein the spring part (9) of the brush is in the form of as an elastic arm extending between a mounting part (10) and the contact part (7) that is arranged close to a free end (13) of the brush.

6. Device according to claim 5 wherein the spring part (9) comprises a multitude of juxtaposed blades (17).

7. Device according to claim 6 wherein the blades have different lengths.

8. Device according to claim 1, wherein the brush (3) is generally V-shaped, with one end being free (13) and the other end being connected to an electrical connecting part (5) adapted to be connected with supply leads.

9. Device according to claim 1, wherein the housing part (2) is a cover of an electric motor and comprises a passage (6) for an axle of a rotor of the motor, the contact part (7) of each brush extending across the passage (6).

* * * * *